(12) United States Patent
Kim

(10) Patent No.: US 8,933,154 B2
(45) Date of Patent: Jan. 13, 2015

(54) FLAME RETARDANT THERMOPLASTIC RESIN COMPOSITION AND MOLDED ARTICLE INCLUDING THE SAME

(71) Applicant: Cheil Industries Inc., Gumi-si (KR)

(72) Inventor: Ki Uk Kim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/924,985

(22) Filed: Jun. 24, 2013

(65) Prior Publication Data

US 2014/0187689 A1    Jul. 3, 2014

(30) Foreign Application Priority Data

Dec. 27, 2012  (KR) .................. 10-2012-0155601

(51) Int. Cl.
  *C07F 9/09*  (2006.01)
  *C08L 69/00* (2006.01)
  *C08K 3/34*  (2006.01)
  *C08K 5/523* (2006.01)

(52) U.S. Cl.
  CPC . *C08L 69/00* (2013.01); *C08K 3/34* (2013.01); *C08K 5/523* (2013.01)
  USPC ........................................................ 524/127

(58) Field of Classification Search
  USPC ........................................................ 524/127
  See application file for complete search history.

(56) References Cited

U.S. PATENT DOCUMENTS

| | | | |
|---|---|---|---|
| 4,129,551 A | 12/1978 | Rueter et al. | |
| 4,801,639 A | 1/1989 | Hoshi et al. | |
| 5,599,626 A | 2/1997 | Fukumura et al. | |
| 5,643,980 A | 7/1997 | Shindoh et al. | |
| 6,258,927 B1 | 7/2001 | Oka et al. | |
| 2008/0166484 A1 | 7/2008 | Smith | |
| 2011/0034587 A1* | 2/2011 | Lee et al. ...................... | 523/220 |

FOREIGN PATENT DOCUMENTS

| | | |
|---|---|---|
| GB | 1348820 A | 3/1974 |
| JP | 63-278951 A | 11/1988 |
| JP | 05-179086 A | 7/1993 |
| JP | 07-097478 A | 4/1995 |
| JP | 07-216144 A | 8/1995 |
| JP | 08-165425 A | 6/1996 |
| JP | 08-176450 A | 7/1996 |
| JP | 11-001574 A | 1/1999 |
| JP | 11-116817 A | 4/1999 |
| JP | 2004-027044 A | 1/2004 |
| KR | 10-1990-0006359 B | 8/1990 |
| KR | 10-2000-0053601 A | 8/2000 |
| KR | 10-0778010 B | 11/2007 |
| WO | 20091084800 A1 | 7/2009 |

OTHER PUBLICATIONS

International Search Report in commonly owned International Application No. PCT/KR2008/005906, dated Apr. 28, 2009, pp. 1-2.
Japanese Office Action received in commonly owned Japanese Application No. 2010-540551 dated Jul. 19, 2012, pp. 1-3.
European Search Report in commonly owned European Application No. 08866843 dated Nov. 29, 2010, pp. 1-4.

* cited by examiner

*Primary Examiner* — Ling Choi
*Assistant Examiner* — Thuy-Ai Nguyen
(74) *Attorney, Agent, or Firm* — Additon, Higgins & Pendleton, P.A.

(57) ABSTRACT

A flame retardant thermoplastic resin composition and a molded article including the same are provided. The flame retardant thermoplastic resin composition includes: (A) a thermoplastic resin; (B) a flame retardant; and (C) a filler, wherein the (C) filler has an oil absorption rate of about 0.1 ml/100 g to about 10 ml/100 g as measured in accordance with ASTM D281. With the filler having a certain range of oil absorption, the flame retardant thermoplastic resin composition can exhibit excellent stiffness and/or flame retardancy.

10 Claims, No Drawings

FLAME RETARDANT THERMOPLASTIC RESIN COMPOSITION AND MOLDED ARTICLE INCLUDING THE SAME

CROSS-REFERENCE TO RELATED APPLICATION

This application claims priority under 35 USC Section 119 to and the benefit of Korean Patent Application 10-2012-0155601, filed Dec. 27, 2012, the entire disclosure of which is incorporated herein by reference.

FIELD OF THE INVENTION

The present invention relates to a flame retardant thermoplastic resin composition and a molded article including the same.

DESCRIPTION OF THE RELATED ART

Thermoplastic resins can exhibit excellent physical properties such as low specific gravity, good moldability, and good impact resistance, as compared with glass or metal. Recently, with the trend of producing low cost, larger and lighter weight electronics, plastic products made of thermoplastic resins are quickly replacing existing glass or metal-based products, thereby broadening the application ranges of thermoplastic resins to fields from electronics to automobile components. Therefore, the thermoplastic resins are required to have certain properties required for exterior materials and desired external appearance and, particularly, to have high flame retardancy and stiffness.

Among thermoplastic resin compositions, a blend of a polycarbonate (PC) resin and an acrylonitrile-butadiene-styrene (ABS) resin which is an aromatic vinyl resin is used as an exterior material for electronics requiring physical properties such as high gloss, high fluidity, high impact resistance, and the like. Typically, in a blend of PC/ABS, a PC resin improves impact resistance and heat resistance, and an ABS resin improves processability, chemical resistance, and the like. Such a PC/ABS blend can exhibit superior physical properties to ABS and permits superior cost reduction to PC, and thus, is used for various purposes. However, since PC/ABS has insufficient stiffness and flame retardancy when used alone, resin compositions reinforced by adding flame retardants and fillers such as talc to thermoplastic resin compositions have been developed.

However, the use of an excess amount of flame retardants can deteriorate properties of thermoplastic resin compositions, such as heat resistance, mechanical properties, and the like. Moreover, even when present in the same amount in the thermoplastic resin composition, fillers can change or deteriorate flame retardancy depending on type, manufacturer, grade, and the like. That is, if inappropriate fillers are used, excess amounts of the flame retardants must be added to improve flame retardancy of the thermoplastic resin composition, and thus, other properties of the thermoplastic resin composition, such as heat resistance, mechanical properties, and the like, can be deteriorated.

Therefore, to prepare a thermoplastic resin composition having good balance of properties, such as flame retardancy, stiffness, and the like, there is a need to select appropriate fillers, which do not require excess use thereof.

SUMMARY OF THE INVENTION

The present invention relates to a thermoplastic resin composition, which employs fillers having a certain range of oil absorption. The composition can exhibit excellent stiffness and flame retardancy with minimal or no deterioration in heat resistance and mechanical properties.

The flame retardant thermoplastic resin composition includes: (A) a thermoplastic resin; (B) a flame retardant; and (C) a filler, wherein the (C) filler has an oil absorption rate of about 0.1 ml/100 g to about 10 ml/100 g as measured in accordance with ASTM D281.

In one embodiment, based on about 100 parts by weight of the (A) thermoplastic resin, the (B) flame retardant may be present in an amount of about 5 parts by weight to about 25 parts by weight, and the filler may be present in an amount of about 1 part by weight to about 50 parts by weight.

In one embodiment, the (A) thermoplastic resin may include at least one of polycarbonate resins, polyphenylene ether resins, acrylic resins, aromatic vinyl resins, polyamide resins, and polyolefin resins.

In one embodiment, the (A) thermoplastic resin may include about 10 wt % to about 99 wt % of (A1) a polycarbonate resin and about 1 wt % to about 90 wt % of (A2) an aromatic vinyl resin.

In one embodiment, the (B) flame retardant may include at least one of phosphorous flame retardants including phosphoric acid, phosphate ester compounds, polyphosphate compounds, red phosphorous compounds, and mixtures thereof; and halogen retardants.

In one embodiment, the (C) filler may include at least one of carbon fibers, glass fibers, glass beads, glass flakes, carbon black, talc, clay, kaolin, and mica.

In one embodiment, the (C) filler may include at least one of talc and/or mica.

In one embodiment, a ratio of the (B) flame retardant to the (C) filler ((B):(C), weight ratio) may be about 10 to about 90: about 10 to about 90.

In one embodiment, the flame retardant thermoplastic resin composition may have a flame retardancy level of V-0 or more, and a burning time of about 30 seconds to about 50 seconds as measured according to the UL-94 vertical flammability test method.

The present invention also relates to a molded article formed of the flame retardant thermoplastic resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

In accordance with one embodiment, a flame retardant thermoplastic resin composition includes: (A) a thermoplastic resin; (B) a flame retardant; and (C) a filler, wherein the (C) filler has an oil absorption rate of about 10 ml/100 g or less as measured in accordance with ASTM D281.

(A) Thermoplastic Resin

In embodiments of the invention, as the (A) thermoplastic resin, any typical thermoplastic resin may be used without limitation. Examples of the (A) thermoplastic resin include without limitation polycarbonate resins, polyphenylene ether resins, acrylic resins, aromatic vinyl resins, polyamide resins, polyolefin resins, and the like. These resins may be used alone or in combination thereof. In one embodiment, as the thermoplastic resin, (A1) a polycarbonate resin and (A2) an aromatic vinyl resin may be used alone or in combination thereof.

(A1) Polycarbonate Resin

The polycarbonate resin is a thermoplastic polycarbonate resin. As the polycarbonate, an aromatic polycarbonate resin prepared by, for example, reacting one or more diphenols represented by Formula 1 with phosgene, a halogen formate, and/or a carbonate diester, may be used.

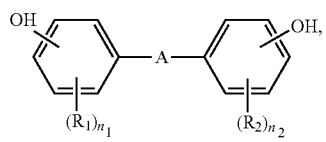

[Formula 1]

wherein A is a single bond, substituted or unsubstituted $C_1$ to $C_5$ alkylene, substituted or unsubstituted $C_1$ to $C_5$ alkylidene, substituted or unsubstituted $C_3$ to $C_6$ cycloalkylene, substituted or unsubstituted $C_5$ to $C_6$ cycloalkylidene, —CO—, —S—, or —$SO_2$—; and $R_1$ and $R_2$ are the same or different and are each independently substituted or unsubstituted $C_1$ to $C_{30}$ alkyl or substituted or unsubstituted $C_6$ to $C_{30}$ aryl; and $n_1$ and $n_2$ are the same or different and are each independently an integer from 0 to 4.

As used here, unless otherwise defined, the term "substituted" means that a hydrogen atom is substituted with a halogen, $C_1$ to $C_{30}$ alkyl, $C_1$ to $C_{30}$ haloalkyl, $C_6$ to $C_{30}$ aryl, $C_2$ to $C_{30}$ heteroaryl, $C_1$ to $C_{20}$ alkoxy, or a combination thereof.

Examples of diphenols include without limitation 4,4'-dihydroxydiphenyl, 2,2-bis-(4-hydroxyphenyl)-propane (also referred to as "bisphenol-A"), 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof. In exemplary embodiments, 2,2-bis-(4-hydroxyphenyl)-propane, 2,2-bis-(3,5-dichloro-4-hydroxyphenyl)-propane and/or 1,1-bis-(4-hydroxyphenyl)-cyclohexane can be used, for example, 2,2-bis-(4-hydroxyphenyl)-propane can be used.

However, the diphenol is not limited thereto, and thus the polycarbonate resin may be prepared using an optional diphenol.

In addition, the polycarbonate resin may be a homopolymer using one kind of diphenol, a copolymer using at least two kinds of diphenols, or a mixture thereof.

Moreover, the (A1) polycarbonate resin may include a linear polycarbonate resin, a branched polycarbonate resin and/or a polyestercarbonate copolymer resin.

An example of the linear polycarbonate resin may include a bisphenol A-based polycarbonate resin. The branched polycarbonate may be prepared by reacting one or more diphenols with about 0.05 mol % to about 2 mol % of a polyfunctional compound containing tri- or higher functional groups, for example, tri or higher-valent phenol groups, with respect to the total amount of diphenols used in polymerization. As the polyestercarbonate copolymer resin, one prepared by a reaction of an ester precursor, for example a bifunctional carboxylic acid, with a diphenol and a carbonate precursor may be used.

The (A1) polycarbonate resin may be used in the form of a homo-polycarbonate resin, a co-polycarbonate resin, or a blend thereof.

The (A1) polycarbonate resin may have a weight average molecular weight (Mw) of about 10,000 g/mol to about 200,000 g/mol, for example, about 15,000 g/mol to about 80,000, without being limited thereto.

The (A1) polycarbonate resin may have a melt flow index (MI) from about 5 g/10 minutes to 50 g/10 minutes, for example from about 10 g/10 minutes to 40 g/10 minutes, as measured in accordance with ISO 1133 at 300° C. under a load of 1.2 kg. The (A1) polycarbonate resin may be a mixture of at least two polycarbonate resins having different melt flow indexes.

(A2) Aromatic Vinyl Resin

The (A2) aromatic vinyl resin may be a polymer of aromatic vinyl monomers (aromatic vinyl polymer resin); a copolymer of an aromatic vinyl monomer and another monomer copolymerizable with the aromatic vinyl monomer (an aromatic vinyl copolymer); and/or a rubber-modified aromatic vinyl copolymer including a rubbery polymer dispersed in the form of particles in a matrix (continuous phase) including the aromatic vinyl polymer. For example, the rubber-modified aromatic vinyl copolymer may be polymerized by adding an aromatic vinyl monomer and optionally adding another monomer, copolymerizable with the aromatic vinyl monomer, to a rubbery polymer.

Generally, the rubber-modified aromatic vinyl copolymer may be prepared by any polymerization methods known in the art, such as emulsion polymerization, suspension polymerization, and mass polymerization, and typically, may be prepared using a (rubber-modified) graft copolymer alone, or using a mixture of a graft copolymer and the aromatic vinyl copolymer. For example, the rubber-modified aromatic vinyl copolymer may be prepared by mixing and extruding these two materials. Here, when using the mixture of the graft copolymer and the aromatic vinyl copolymer, it is desirable that two materials be mixed in consideration of compatibility. In addition, in mass polymerization, the rubber-modified aromatic vinyl copolymer may be prepared through single-step reaction without separately preparing the graft copolymer and the aromatic vinyl copolymer.

In either case, a rubber (rubbery polymer) may be present in an amount of about 5 wt % to about 50 wt % in the final rubber-modified aromatic vinyl copolymer. In some embodiments, the final rubber-modified aromatic vinyl copolymer can include the rubber in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the rubber can be in a range from about any of the foregoing amounts to about any other of the foregoing amounts.

Further, the rubber may have a z-average particle size of about 0.05 μm to about 6.0 μm. Within this range, the composition can exhibit excellent properties in terms of impact resistance, and the like.

The graft copolymer may be obtained by graft copolymerization of a rubbery polymer, an aromatic vinyl monomer, and a monomer copolymerizable with the aromatic vinyl monomer, and may further include a monomer imparting processability and heat resistance, as needed.

Examples of the rubbery polymer include without limitation diene rubbers such as polybutadiene, poly(styrene-butadiene), poly(acrylonitrile-butadiene), and the like; saturated rubbers obtained by adding hydrogen to the diene rubbers; isoprene rubbers; acrylic rubbers such as poly(butyl acrylate); ethylene-propylene-diene monomer (EPDM) terpolymers, and the like, and combinations thereof. Among these materials, the rubbery polymer can be a diene rubber, for example a butadiene rubber.

The graft copolymer may include the rubbery polymer in an amount of about 5 wt % to about 65 wt %, for example about 10 wt % to about 60 wt %, and as another example about 20 wt % to about 50 wt %, based on the total weight of the graft copolymer. In some embodiments, the graft copolymer may include the rubbery polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 wt %. Further, according to some embodiments of the present invention, the amount of the rubbery polymer can be in a range from about any of the foregoing amounts to about any other of the foregoing amounts.

Within this range, the composition can have a balance of excellent impact strength and mechanical properties.

The rubbery polymer (rubbery particles) may have an average (z-average) particle size of about 0.05 μm to about 6 μm, for example about 0.15 μm to about 4 μm, and as another example about 0.25 μm to about 3.5 μm. Within this range, the composition can exhibit excellent properties in terms of impact strength and appearance.

The aromatic vinyl monomer may be an aromatic vinyl monomer capable of being grafted to the rubbery copolymer. Examples of the aromatic vinyl monomer capable of being grafted to the rubbery copolymer may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like, and combinations thereof. In exemplary embodiments, the aromatic vinyl monomer can include styrene.

The graft copolymer may include the aromatic vinyl monomer in an amount of about 15 wt % to about 94 wt %, for example about 20 wt % to about 80 wt %, and as another example about 30 wt % to about 60 wt %, based on the total weight of the graft copolymer. In some embodiments, the graft copolymer can include the aromatic vinyl monomer in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, or 94 wt %. Further, according to some embodiments of the present invention, the amount of the aromatic vinyl monomer can be in a range from about any of the foregoing amounts to about any other of the foregoing amounts.

Within this range, the composition can have a balance of excellent impact strength and mechanical properties.

Examples of the monomer copolymerizable with the aromatic vinyl monomer may include without limitation vinyl cyanide compounds such as acrylonitrile; unsaturated nitriles such as ethacrylonitrile, methacrylonitrile, and the like. These monomers may be used alone or in combination thereof.

The graft copolymer may include the monomer copolymerizable with the aromatic vinyl monomer in an amount of about 1 wt % to about 50 wt %, for example about 5 wt % to about 45 wt %, and as another example about 10 wt % to about 30 wt %, based on the total weight of the graft copolymer. In some embodiments, the graft copolymer may include the monomer copolymerizable with the aromatic vinyl monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the monomer copolymerizable with the aromatic vinyl monomer can be in a range from about any of the foregoing amounts to about any other of the foregoing amounts.

Within this range, the flame retardant thermoplastic resin composition can have a balance of excellent impact strength and mechanical properties.

Examples of the monomer for imparting processability and heat resistance may include without limitation acrylic acid, methacrylic acid, maleic anhydride, N-substituted maleimide, and the like, and combinations thereof.

The monomer for imparting processability and heat resistance is optionally present in an amount of about 15 wt % or less, for example from about 0.1 wt % to about 10 wt %, based on the total weight of the graft copolymer. In some embodiments, the graft copolymer can include the monomer for imparting processability and heat resistance in an amount of 0 (the monomer is not present), about 0 (the monomer is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 wt %. Further, according to some embodiments of the present invention, the amount of the monomer for imparting processability and heat resistance can be in a range from about any of the foregoing amounts to about any other of the foregoing amounts.

Within this range, the monomer can impart processability and heat resistance to the flame retardant thermoplastic resin composition with minimal or no deterioration of other properties.

The aromatic vinyl copolymer may be prepared using a mixture of the monomers, excluding the rubber (rubbery polymer) among components of the graft copolymer, and the ratio of the monomers may vary depending on compatibility, and the like. For example, the aromatic vinyl copolymer may be obtained by copolymerization of the aromatic vinyl monomer and the monomer copolymerizable with the aromatic vinyl monomer.

Examples of the aromatic vinyl monomer include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like, and combinations thereof. In exemplary embodiments, the aromatic vinyl monomer can include styrene.

In addition, examples of the monomer copolymerizable with the aromatic vinyl monomer may include without limitation vinyl cyanide compounds such as acrylonitrile; unsaturated nitriles such as ethacrylonitrile, methacrylonitrile, and the like. These monomers may be used alone or in combination thereof.

The aromatic vinyl copolymer may further include the monomer for imparting processability and heat resistance as needed. Examples of the monomer for imparting processability and heat resistance may include without limitation acrylic acid, methacrylic acid, maleic anhydride, N-substituted maleimide, and the like, and combinations thereof.

The aromatic vinyl copolymer may include the aromatic vinyl monomer in an amount of about 50 wt % to about 95 wt %, for example about 60 wt % to about 90 wt %, and as another example about 70 wt % to about 80 wt %, based on the total weight of the aromatic vinyl copolymer. In some embodiments, the aromatic vinyl copolymer may include the aromatic vinyl monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the aromatic vinyl monomer can be in a range from about any of the foregoing amounts to about any other of the foregoing amounts.

Within this range, the flame retardant thermoplastic resin composition can have a balance of excellent impact strength and mechanical properties.

The aromatic vinyl copolymer may include the monomer copolymerizable with the aromatic vinyl monomer in an amount of about 5 wt % to about 50 wt %, for example about 10 wt % to about 40 wt %, and as another example about 20 wt % to about 30 wt %, based on the total weight of the aromatic vinyl copolymer. In some embodiments, the aromatic vinyl copolymer may include the monomer copolymerizable with the aromatic vinyl monomer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the monomer copolymerizable with the aromatic vinyl monomer can be in a range from about any of the foregoing amounts to about any other of the foregoing amounts.

Within this range, the flame retardant thermoplastic resin composition can have a balance of excellent impact strength and mechanical properties.

In addition, the monomer for imparting processability and heat resistance may be optionally present in an amount of about 30 wt % or less relative to the total weight of the aromatic vinyl copolymer, for example about 0.1 wt % to about 20 wt %. In some embodiments, the aromatic vinyl copolymer can include the monomer for imparting processability and heat resistance in an amount of 0 (the monomer is not present), about 0 (the monomer is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the monomer for imparting processability and heat resistance can be in a range from about any of the foregoing amounts to about any other of the foregoing amounts.

Within this range, the monomer can impart processability and heat resistance to the flame retardant thermoplastic resin composition with minimal or no deterioration of other properties.

The aromatic vinyl copolymer may have a weight average molecular weight of about 30,000 g/mol to about 500,000 g/mol, without being limited thereto.

Examples of the rubber-modified aromatic vinyl copolymer may include without limitation acrylonitrile-butadiene-styrene (ABS) copolymers, acrylonitrile-ethylene-propylene rubber-styrene (AES) copolymers, acrylonitrile-acrylic rubber-styrene (AAS) copolymers, and the like, and combinations thereof. As used herein, in the ABS resin, a copolymer (g-ABS) obtained by grafting a styrene monomer, which is an aromatic vinyl compound, and an acrylonitrile monomer, which is an unsaturated nitrile compound, to a core butadiene rubbery polymer is dispersed as the graft copolymer in a styrene-acrylonitrile (SAN) copolymer as the aromatic vinyl copolymer.

Further, the rubber-modified aromatic vinyl copolymer may include the graft copolymer in an amount of about 10 wt % to about 100 wt %, for example about 15 wt % to about 90 wt %. The rubber-modified aromatic vinyl copolymer may optionally include the aromatic vinyl copolymer in an amount of about 90 wt % or less, for example about 10 wt % to about 85 wt %.

In some embodiments, the rubber-modified aromatic vinyl copolymer can include the graft copolymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt %. Further, according to some embodiments of the present invention, the amount of the graft copolymer can be in a range from about any of the foregoing amounts to about any other of the foregoing amounts.

In some embodiments, the rubber-modified aromatic vinyl copolymer can include the aromatic vinyl copolymer in an amount of 0 (the aromatic vinyl copolymer is not present) about 0 (the aromatic vinyl copolymer is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the aromatic vinyl copolymer can be in a range from about any of the foregoing amounts to about any other of the foregoing amounts.

Within this range, the flame retardant thermoplastic resin composition can have a balance of excellent impact strength and mechanical properties.

In one embodiment, examples of the (A2) aromatic vinyl resin can include without limitation polystyrene (PS), high-impact polystyrene (HIPS), acrylonitrile-butadiene-styrene (ABS) copolymers, styrene-acrylonitrile (SAN) copolymers, acrylonitrile-styrene-acrylate (ASA) copolymers, and the like. These resins may be used alone or in combination thereof. A polyphenylene ether-based resin and a rubber-modified aromatic vinyl resin having excellent compatibility may be used.

A method for preparing the (A2) aromatic vinyl resin is well known to those skilled in the art, and the resin can be commercially obtained.

For example, the (A2) aromatic vinyl resin may be polymerized by thermal polymerization without an initiator, or in the presence of an initiator. Examples of the polymerization initiator may include without limitation peroxide initiators such as benzoyl peroxide, t-butyl hydroperoxide, acetyl peroxide, cumene hydroperoxide, and the like; and azo initiators such as azobisisobutyronitrile, without being limited thereto. These initiators may be used alone or in combination thereof.

The (A2) aromatic vinyl resin may be prepared by mass polymerization, suspension polymerization, emulsion polymerization, or combinations thereof. In exemplary embodiments, mass polymerization can be used.

The (A2) aromatic vinyl resin may have a weight average molecular weight of about 10,000 g/mol to about 500,000 g/mol as measured by GPC (gel permeation chromatography), without being limited thereto.

When the (A) thermoplastic resin according to the invention is a mixture of the (A1) polycarbonate resin and the (A2) aromatic vinyl resin, the (A1) polycarbonate resin may be present in an amount of about 10 wt % to about 99 wt %, for example about 20 wt % to about 85 wt %, and the (A2) aromatic vinyl resin may be present in an amount of about 1 part by weight to about 90 wt %, for example about 15 wt % to about 80 wt %.

In some embodiments, the (A) thermoplastic resin can include the (A1) polycarbonate resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the (A1) polycarbonate resin can be in a range from about any of the foregoing amounts to about any other of the foregoing amounts.

In some embodiments, the (A) thermoplastic resin can include the (A2) aromatic vinyl resin in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the (A2) aromatic vinyl resin can be in a range from about any of the foregoing amounts to about any other of the foregoing amounts.

Within this range, the flame retardant thermoplastic resin composition can exhibit excellent properties in terms of impact strength, heat resistance, and the like.

(B) Flame Retardant

Typical liquid flame retardants used for thermoplastic resin compositions may be used as the (B) flame retardant. Examples of the flame retardant may include without limitation phosphorous flame retardants, such as phosphoric acid, phosphate ester compounds, polyphosphate compounds, red phosphorous compounds, and the like; halogen retardants, and the like, and mixtures thereof. These retardants may be used alone or in combination thereof. In exemplary embodiments, the flame retardant is a phosphorous flame retardant, which is environmentally friendly, for example a phosphate ester compound. Examples of the phosphate ester compounds may include without limitation diphenylphosphate, triphenylphosphate, tricresylphosphate, trixylenylphosphate, tri(2,6-dimethylphenyl)phosphate, tri(2,4,6-trimethylphenyl)phosphate, tri(2,4-ditert-butylphenyl)phosphate, tri(2,6-dimethylphenyl)phosphate, resorcinol bis(diphenyl)phosphate, resorcinol bis(2,6-dimethylphenyl)phosphate, resorcinol bis(2,4-ditert-butylphenyl)phosphate, hydroquinol bis(2,6-dimethylphenyl)phosphate, hydroquinol bis(2,4-ditert-butylphenyl)phosphate, and the like. These phosphate esters may be used alone or in combination thereof.

Here, if liquid, the (B) flame retardant may be used without any treatment, or after being diluted with an organic solvent, and if not liquid, the (B) flame retardant may be used after being dissolved in water or an organic solvent. As used herein, the term "liquid flame retardant" also includes all of the aforementioned flame retardant in a liquid state.

As the organic solvent for diluting or dissolving the (B) flame retardant, typical organic solvents capable of dissolving flame retardants may be used without limitation. Examples of the organic solvent may include without limitation hexanes, benzene, toluene, xylene, diethyl ether, chloroform, ethyl acetates, dioxanes, tetrahydrofuran (THF), dichloromethane (DCM), acetones, acetonitrile, dimethylformamide (DMF), dimethylsulfoxide (DMSO), acetic acid, N-butanol, isopropanol (IPA), N-propanol, ethanol, methanol, and the like, and combinations thereof.

The flame retardant thermoplastic resin composition may include the (B) flame retardant in an amount of about 5 parts by weight to about 25 parts by weight, for example about 10 parts by weight to about 20 parts by weight, based on about 100 parts by weight of the thermoplastic resin (A). In some embodiments, the flame retardant thermoplastic resin composition can include the (B) flame retardant in an amount of about 5, 6, 7, 8, 9, 10, 11, 12, 13, 14, 15, 16, 17, 18, 19, 20, 21, 22, 23, 24, or 25 parts by weight. Further, according to some embodiments of the present invention, the amount of the (B) flame retardant can be in a range from about any of the foregoing amounts to about any other of the foregoing amounts.

Within this range, the flame retardant thermoplastic resin composition can exhibit excellent flame retardancy without deterioration of properties, such as heat resistance, mechanical properties, and the like.

(C) Filler

The (C) filler prevents agglomeration of the (B) flame retardant so that the flame retardant can be uniformly dispersed in the thermoplastic resin composition, and has an oil absorption rate of about 0.1 ml/100 g to 10 ml/100 g, for example about 0.5 ml/100 g to 8 ml/100 g, as measured in accordance with ASTM D281. That is, the amount of oil required to wet 100 g of the filler in a wet state is about 10 ml or less. If the (C) filler has an oil absorption rate exceeding about 10 ml/100 g, the flame retardant can aggregate with the fillers, whereby flame retardancy of the thermoplastic resin composition can be deteriorated.

The (C) filler may have a shape such as spherical, flake, cylindrical shapes, and the like, and may have an average particle size of about 2.0 μm to about 2.5 μm, without being limited thereto.

Examples of the (C) filler, which has a total oil absorption rate of about 0.1 ml/100 g to about 10 ml/100 g, may include without imitation carbon fibers, glass fibers, glass beads, glass flakes, carbon black, talc, clay, kaolin, mica, and the like. These fillers may be used alone or in combination thereof. In exemplary embodiments, talc and/or mica can be used as the filler.

The flame retardant thermoplastic resin composition may include the (C) filler in an amount of about 1 part by weight to about 50 parts by weight, for example about 10 parts by weight to about 40 parts by weight, based on about 100 parts by weight of the (A) thermoplastic resin. In some embodiments, the flame retardant thermoplastic resin composition may include the (C) filler in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the (C) filler can be in a range from about any of the foregoing amounts to about any other of the foregoing amounts.

Within this range, the flame retardant thermoplastic resin composition can exhibit excellent properties in terms of stiffness, flame retardancy, and the like.

In one embodiment, the ratio of the (B) flame retardant to the (C) filler ((B):(C), weight ratio) may be about 10 to about 90: about 10 to about 90, for example about 30 to about 70: about 30 to about 70, and as another example about 40 to about 60: about 40 to about 60.

In some embodiments, the combination of the (B) flame retardant and the (C) filler can include the (B) flame retardant in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the (B) flame retardant can be in a range from about any of the foregoing amounts to about any other of the foregoing amounts.

In some embodiments, the combination of the (B) flame retardant and the (C) filler can include the (C) filler in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the (C) filler can be in a range from about any of the foregoing amounts to about any other of the foregoing amounts.

Within this range, the flame retardant thermoplastic resin composition can exhibit excellent properties in terms of stiffness, flame retardancy, and the like.

In addition to the above components, the flame retardant thermoplastic resin composition may further include one or more additives, such as flame retardant aids, lubricants, plasticizers, heat stabilizers, anti-dripping agents, antioxidants, compatibilizers, photostabilizers, pigments, dyes, inorganic additives, and the like, as needed. These additives may be used alone or in combination thereof. For example, the additives may be present in an amount of about 0.1 parts by weight to about 10 parts by weight based on about 100 parts by weight of the (A) thermoplastic resin, without being limited thereto.

When evaluated on a 1.2 mm thick specimen according to the UL-94 vertical flammability test method, the flame retardant thermoplastic resin composition according to the invention may have a flame retardancy level of V-0 or higher, and a burning time from about 30 seconds to about 50 seconds, for example from about 35 seconds to about 45 seconds.

The flame retardant thermoplastic resin composition can enable uniform dispersion of the flame retardant therein, which can maximize flame retardancy and/or stiffness even when the flame retardant and the filler are used in low concentrations. Therefore, a small amount of the flame retardant may be used in the flame retardant thermoplastic resin composition according to the invention to impart flame retardancy to the composition with minimal or no deterioration of inherent properties thereof.

In addition, the flame retardant thermoplastic resin composition may be prepared in the form of pellets by mixing the above components and other additives, followed by melt extrusion in an extruder. Various molded articles may be produced using the prepared pellets through various molding methods, such as injection molding, extrusion, vacuum molding, cast molding, and the like.

The present invention also relates to a molded article formed of the thermoplastic resin composition. Since the molded article can exhibit excellent properties in terms of stiffness, flame retardancy, and the like, the molded article may be broadly applied to components of electric and electronic products, exterior materials, automobile parts, miscellaneous goods, structural materials, and the like.

Now, the present invention will be described in more detail with reference to some examples. However, it should be noted that these examples are provided for illustration only and are not to be construed in any way as limiting the present invention.

EXAMPLES

Details of each component used in the following examples and comparative examples are as follows:
(A) Thermoplastic Resin
(A-1) Polycarbonate resin: Polycarbonate (SC-1620, Cheil Industries Inc.) having a melt flow index (MI) of 13±2 is used, wherein the melt flow index (MI) is measured in accordance with ISO 1133 at 300° C. under a load of 1.2 kg.

(A-2) Polycarbonate resin: Polycarbonate (SC-1080, Cheil Industries Inc.) having a melt flow index (MI) of 30±3 is used, wherein the melt flow index (MI) is measured in accordance with ISO 1133 at 300° C. under a load of 1.2 kg.

(A-3) Polycarbonate resin: Polycarbonate (PTULG, Teijin Co., Ltd.) having a melt flow index (MI) of 30±3 is used, wherein the melt flow index (MI) is measured in accordance with ISO 1133 at 300° C. under a load of 1.2 kg. (For reference, A-2 is interfacial PC, and A-3 is melt PC. Thus, PDI values according to molecular weights of PCs differ, and the interfacial PC has a narrower molecular weight distribution.)

(A-4) Aromatic vinyl resin (g-ABS): A rubber-modified styrene graft copolymer (g-ABS, CHT, Cheil Industries Inc.) including a polybutadiene rubber (PBR), a styrene monomer and acrylonitrile is used, wherein the polybutadiene rubber (PBR) has an average particle diameter of 310 nm, and the weight ratio of the styrene monomer to the acrylonitrile is 73/27.

(A-5) Aromatic vinyl resin (SAN): An acrylonitrile-styrene copolymer (SAN, AP-70, Cheil Industries Inc.) having a weight average molecular weight of 153,000 g/mol and including 24 parts by weight of acrylonitrile is used.

(B) Flame Retardant

Bisphenol A diphosphate (CR-741, Daihachi Co., Ltd.) is used.

(C) Filler

After being measured five times according to ASTM D281, an average of the measured values is obtained to determine oil absorption of the (C) filler.

(C-1) Talc: A compressed grade magnesium silicate hydrate (UPN HS-T 0.5, Hayashi Co., Ltd.) having an oil absorption rate of 8 ml/100 g as measured in accordance with ASTM D281 is used.

(C-2) Talc: An uncompressed grade magnesium silicate hydrate (KC-3000, KOCH Co., Ltd.) having an oil absorption rate of 10 ml/100 g as measured in accordance with ASTM D281 is used.

(C-3) Mica: An aluminum potassium silicate (200-HK, Suzorite Co., Ltd.) having an oil absorption rate of 8 ml/100 g as measured in accordance with ASTM D281 is used.

(C-4) Talc: A compressed grade magnesium silicate hydrate (SDC-F7, Haicheng Xinda Co., Ltd.) having an oil absorption rate of 15 ml/100 g as measured in accordance with ASTM D281, is used.

(C-5) Talc: An uncompressed grade magnesium silicate hydrate (KC-2000, KOCH Co., Ltd.) having an oil absorption rate of 12 ml/100 g as measured in accordance with ASTM D281 is used.

Examples 1 to 3 and Comparative Examples 1 to 4

With these components placed in amounts as listed in Table 1 in a reactor, 0.8 parts by weight of a Teflon powder anti-dripping agent (POLY TS 30A, Pacific InterChem. Co., Ltd.), 0.2 parts by weight of a hindered phenol antioxidant (Songnox-1076, Songwon Co., Ltd.), 0.1 parts by weight of a montanic acid wax (Luwax E, BASF Co., Ltd.), and 1 part by weight of RDP (PX-200, Daihachi Co., Ltd.) as flame retardant aids based on 100 parts by weight of the (A) thermoplastic resin are added to the reactor, followed by melting and kneading in a twin-screw melt extruder with a diameter of 45 mm at 250° C., thereby preparing a resin composition in the form of chips. After dehydrating the prepared chips at 80° C. for 5 hours or more, specimens for evaluating flame retardancy and mechanical properties are prepared using a screwtype injection machine at 240° C. to 280° C. The prepared specimens are evaluated by the following methods, and results are shown in Table 1.

Evaluation of Properties (1) Flame retardancy and burning time: Flame retardancy and burning time are measured on a 1.2 mm thick specimen according to the UL-94 vertical flammability test method.

(2) Vicat softening temperature (VST): Vicat softening point is measured under a load of 5 kgf in accordance with ASTM D1525. (unit: ° C.)

(3) Izod impact strength: Izod impact strength is measured on a 3.2 mm thick notched Izod specimen in accordance with ASTM D256. (unit: kgf·cm/cm)

TABLE 1

|     |     | Example 1 | Example 2 | Example 3 | Comparative Example 1 | Comparative Example 2 | Comparative Example 3 | Comparative Example 4 |
|---|---|---|---|---|---|---|---|---|
| (A) | (A-1) (wt %) | 15 | 15 | 15 | 15 | 15 | 15 | 15 |
|     | (A-2) (wt %) | 40 | 40 | 40 | 40 | 40 | 40 | 40 |
|     | (A-3) (wt %) | 30 | 30 | 30 | 30 | 30 | 30 | 30 |
|     | (A-4) (wt %) | 10 | 10 | 10 | 10 | 10 | 10 | 10 |
|     | (A-5) (wt %) | 5 | 5 | 5 | 5 | 5 | 5 | 5 |
| (B) (parts by weight) |  | 16 | 16 | 16 | 16 | 16 | 19 | 19 |
| (C) | (C-1) (parts by weight) | 20.6 | — | — | — | — | — | — |
|     | (C-2) (parts by weight) | — | 20.6 | — | — | — | — | — |
|     | (C-3) (parts by weight) | — | — | 20.6 | — | — | — | — |
|     | (C-4) (parts by weight) | — | — | — | 20.6 | — | 20.6 | — |
|     | (C-5) (parts by weight) | — | — | — | — | 20.6 | — | 20.6 |
| Oil absorption (ml/100 g) |  | 8 | 10 | 8 | 15 | 12 | 15 | 12 |
| Impact strength (kgf cm/cm) |  | 5 | 5.1 | 5.1 | 5.1 | 4.8 | 3.2 | 2.8 |
| VST (° C.) |  | 98.8 | 99 | 98.9 | 99.2 | 98.6 | 95.3 | 94.8 |
| Flame retardancy |  | V-0 | V-0 | V-0 | V-1 | V-1 | V-1 | V-1 |
| Burning time (seconds) |  | 41 | 45 | 35 | 79 | 68 | 75 | 59 |

Parts by weight of (B) and (C): parts by weight based on 100 parts by weight of the (A) thermoplastic resin From the results shown in Table 1, it can be seen that the flame retardant thermoplastic resin compositions prepared in Examples 1 to 3 having an oil absorption rate of 10 ml/100 g or less have short burning times and exhibit excellent flame retardancy without deterioration of impact strength, heat resistance (VST), and the like, as compared with the flame retardant thermoplastic resin compositions prepared in Comparative Examples 1 to 2 having an oil absorption above 10 ml/100 g. In addition, in Comparative Examples 3 to 4, it can be seen that properties, such as impact strength, heat resistance, and the like are deteriorated when an excess of the flame retardant is used to improve flame retardancy.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flame retardant thermoplastic resin composition comprising:

(A) a thermoplastic resin;

(B) a flame retardant; and (C) a filler, wherein the (C) filler has an oil absorption rate of about 0.1 ml/100 g to about 10 ml/100 g as measured in accordance with ASTM D281.

2. The thermoplastic resin composition according to claim 1, wherein the flame retardant is present in an amount of about 5 parts by weight to about 25 parts by weight, and the filler is present in an amount of about 1 part by weight to about 50 parts by weight, based on about 100 parts by weight of the (A) thermoplastic resin.

3. The thermoplastic resin composition according to claim 1, wherein the (A) thermoplastic resin comprises a polycarbonate resin, polyphenylene ether resin, acrylic resin, aromatic vinyl resin, polyamide resin, polyolefin resin or a combination thereof.

4. The thermoplastic resin composition according to claim 1, wherein the (A) thermoplastic resin comprises (A1) about 10 wt % to about 99 wt % of a polycarbonate resin and (A2) about 1 wt % to about 90 wt % of an aromatic vinyl resin.

5. The thermoplastic resin composition according to claim 1, wherein the (B) flame retardant comprises a phosphorous flame retardant, wherein the phosphorous flame retardant includes phosphoric acid, phosphate ester compound, polyphosphate compound, red phosphorous compound, or a combination thereof; a halogen retardant; or a combination thereof.

6. The thermoplastic resin composition according to claim 1, wherein the (C) filler comprises carbon fibers, glass fibers, glass beads, glass flakes, carbon black, talc, clay, kaolin, mica, or a combination thereof.

7. The thermoplastic resin composition according to claim 1, wherein the (C) filler comprises talc, mica, or a combination thereof.

8. The thermoplastic resin composition according to claim 1, wherein the (B) flame retardant and the (C) filler are present in a weight ratio (B):(C) of about 10:90 to about 90:10.

9. The thermoplastic resin composition according to claim 1, wherein the resin composition has a flame retardancy level of V-0 or higher, and a burning time of about 30 seconds to about 50 seconds, as measured according to a UL-94 vertical flammability test method.

10. A molded article formed of the flame retardant thermoplastic resin composition according to claim 1.

* * * * *